3,370,027
POLYMERIC COMPOSITIONS PREPARED FROM A HYDROCARBON FRACTION COMPOSED SUBSTANTIALLY OF DIMERS AND CODIMERS OF CONJUGATED DIENES
Joseph Z. Matt, Chicago, Ill., assignor to Velsicol Chemical Corporation, Chicago, Ill., a corporation of Illinois
No Drawing. Continuation-in-part of application Ser. No. 361,228, Apr. 20, 1964, which is a continuation-in-part of application Ser. No. 150,873, Nov. 8, 1961. This application Mar. 21, 1967, Ser. No. 624,722
10 Claims. (Cl. 260—22)

ABSTRACT OF THE DISCLOSURE

A process for the production of an improved water-soluble polymeric composition by (1) reacting a hydrocarbon fraction of dimers and codimers of conjugated dienes with from about 42 to about 60% by weight of the total reactants of a monounsaturated carboxylic acid anhydride, (2) reacting the product of (1) with a glycol until the reaction product is formed having an acid number of from about 20 to about 100, and (3) reacting said reaction product with a basic material; and the composition thus produced. The composition can also contain a glyceride or a fatty acid by adding the same to the product of (1) and reacting the resulting mixture with the glycol as described above.

---

This application is a continuation-in-part of my copending application Serial No. 361,228, filed April 20, 1964, now abandoned which in turn is a continuation in part of my then copending application Serial No. 150,873, filed November 8, 1961, now abandoned.

This invention relates to new, improved water-soluble polymeric compositions of matter and to a process for the production thereof. More particularly, this invention relates to new, improved water-soluble polymeric compositions prepared from a hydrocarbon fraction composed substantially of dimers and codimers of conjugated dienes, and α,β-ethylenically monounsaturated polycarboxylic acid anhydride, a suitable glycol, and a basic material.

It has now been found that water-based coatings, particularly water-based enamels, can be greatly improved by using as the essential starting ingredient a hydrocarbon fraction composed substantially of dimers and codimers of conjugated dienes rather than a fraction composed substantially of tetramers and higher polymers of the conjugated dienes. The finished coatings subsequently produced from the improved polymeric compositions defined herein have greatly improved properties as compared to the properties of the finished coatings produced from the polymeric compositions of the copending application. For example, the coatings produced from the polymeric compositions of the present invention have outstanding flexibility, impact resistance and chemical resistance to many of the chemical substances commonly encountered in the normal application and usage of these coatings.

Therefore, it is one object of the present invention to provide improved water-soluble polymeric compositions of matter.

It is another object of this invention to provide improved polymeric compositions which can be applied as aqueous solutions and which cure to water-insoluble flexible coatings having outstanding flexibility, impact resistance, and chemical resistance.

Still another object of this invention is to provide polymeric compositions useful in the manufacture of water-based coatings, particularly water-based enamels which are readily cured by baking.

These and other objects of the present invention will be readily apparent from the ensuing description.

The above objects can be accomplished by the process of the present invention. This process comprises (1) reacting by heating a mixture of a hydrocarbon fraction composed substantially of dimers and codimers of conjugated aliphatic and cyclic dienes with an α,β-ethylenically monounsaturated polycarboxylic acid anhydride; (2) esterifying the reaction product of (1) with a suitable glycol to yield a partially esterified reaction product having an acid number of from about 20 to about 100; and (3) reacting the said product with a basic material.

Hydrocarbon fractions suitable for use as a reactant in the process of the present invention for preparing the polymeric composition of the invention are those fractions preferably having a molecular weight of approximately 120–140, and preferably substantially free of conjugated unsaturation, which are composed substantially of dimers and codimers of conjugated aliphatic and cyclic dienes, said dienes preferably containing from 4 to 7 carbon atoms per diene monomer molecule and most preferably having from 4 to 6 carbon atoms per diene monomer molecule. Examples of suitable conjugated aliphatic dienes are: isoprene, cis-piperylene, trans-piperylene, 1,3-hexadiene, and 2,4-hexadiene; while examples of suitable conjugated cyclic dienes are cyclopentadiene, methyl cyclopentadiene, and 1,3-cyclohexadiene.

A suitable starting hydrocarbon fraction reactant can be prepared by mixing dimers and codimers of the above-described suitable conjugated aliphatic and cyclic dienes. A particularly preferred reactant for the process of the present invention is a dimer and codimer fraction having an aveage molecular weight of about 135 which is produced from a liquid petroleum hydrocarbon stream composed substantially of dimers, trimers, codimers, cotrimers, tetramers and higher polymers of conjugated dienes having from 4 to 6 carbon atoms per diene monomer molecule. The said liquid petroleum hydrocarbon stream can be fractionally distilled, preferably in vacuo, to recover the preferred dimer and codimer fraction as an overhead distillate fraction after removing overhead of any monomers, low boiling saturates, mono-olefins, and nonconjugated dienes present in the hydrocarbon stream.

A typical hydrocarbon stream from which the desired hydrocarbon dimer and codimer fraction reactant can be prepared by the above procedure is one composed substantially of dimers, trimers, codimers, cotrimers and higher polymers of conjugated aliphatic and cyclic dienes, and having the following physical properties; A.P.I. gravity, 26 degrees at 60° F.; Gardner color, 3; viscosity (S.S.U. at 100° F.), 43 sec.; flash point (Cleveland Open Cup), 135–138° F.; Iodine number 326; and Aniline point, 34.2° C.

Suitable α,β-ethylenically monounsaturated polycarboxylic acid inhydrides for use in preparing the polymeric compositions of this invention are exemplified by maleic anhydride, citraconic anhydride, cis-aconitic anhydride, and mixtures thereof.

To effect the reaction described herein, it is necessary to utilize about 42% or greater quantity, by weight, of suitable anhydride, based on total weight of hydrocarbon fraction and anhydride mixture. Anhydride normally constitutes from about 45% to about 60% by weight of the completely reacted product. With maleic anhydride, a quantity of anhydride in the order of 42% by weight of total reactants has been found satisfactory.

The reaction temperature should be maintained between about 125° and about 250° C., since little or no reaction is observed at temperatures lower than 100° C., and temperatures higher than 250° C. result in the formation of extremely dark products possessing inferior properties. A temperature in the range from about 150° C. to about 200° C. is preferred in order to utilize a practical and reasonable reaction time and to obtain a product of favorable color and properties.

The reaction time is dependent upon the temperature utilized and the color and properties of the product desired. Generally, a reaction time of about 24 hours is required for reaction temperatures of about 125° C., 4 hours at about 165° C., while a considerably shorter reaction time in the order of about 2 hours is required for temperatures of about 250° C., with the latter conditions yielding a darker product than the former conditions. A more practical reaction time of between about 3 hours and about 10 hours is required for temperatures in the preferred range of from 150° to 200° C.

Upon completion of the reaction, the total reacted material is stripped of excess reactants by vacuum distillation. The residue after distillation solidifies to the reaction product utilized in the second step of the process of the present invention.

The second step of the process of the present invention, the esterification, can be readily carried out by heating the reaction product of the previous step with a suitable glycol. Suitable glycols are those having the formula

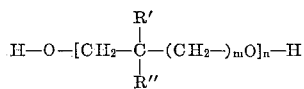

wherein R' and R" are independently selected from the group consisting of hydrogen and alkyl groups containing from 1 to 3 carbon atoms, $m$ is an integer from 0 to 10 and $n$ is an integer from 1 to 50. Suitable glycols are the alkylene glycols such as neopentyl glycol and 1,5-pentanediol, and the alkylene glycols such as ethylene glycol and propylene glycol and their condensation products, namely, polyethylene glycols and polypropylene glycols. Thus, in the above formula when R' and R" are methyl groups, and $m$ and $n$ are both one, the formula represents neopentyl glycol; whereas when R' and R" are hydrogen, $m$ is 3 and $n$ is one, the formula represents 1,5-pentanediol. Similarly when R' and R" are hydrogen, $m$ is zero and $n$ is one, the formula represents ethylene glycol; when $n$ is 2, diethylene glycol; when $n$ is 3, triethylene glycol; etc. Glycols of the above structure wherein $n$ is from 1 to 10 are preferred.

From about 30% to about 100% by weight of glycol to reaction product of step (1) can be utilized to effect successfully the esterification described herein. It is preferred to utilize a weight ratio of from about one-half to about an equal weight of glycol to reaction product of step (1) to obtain an ester which ultimately results in a coating having the optimum balance of hardness and flexibility.

The compositions of the present invention can be readily further improved by providing increased flexibility to the finished coatings, by incorporating a dicarboxylic acid containing from 4 to 12 carbon atoms into the composition in the esterification step. Exemplary of the suitable dicarboxylic acids are the aryl dicarboxylic acids, such as phthalic acid, and the straight chain aliphatic dicarboxylic acids such as succinic, glutaric, adipic, pimelic, suberic, azelaic, and sebacic acids. Preferred acids are straight chain aliphatic dicarboxylic acids containing from 4 to 8 carbon atoms, such as adipic acid. From about 25 to about 60% by weight of a suitable acid, based on the weight of the reaction product of step (1), can be utilized to provide the coating prepared from the polymeric composition of the present invention with the desired flexibility.

The esterification reaction is conveniently performed in the absence of a solvent by heating the glycol until it melts, adding the reaction product of step (1), heating with stirring preferably in an inert atmosphere, such as nitrogen, and adding the dicarboxylic acid, if used, thereto, and heating and stirring the mixture.

Alternatively the esterification reaction can be carried out in the presence of a minor proportion of solvent. While the exact amount of solvent is not critical, an amount sufficient to provide dispersion of the reaction product of the previous step without excess dilution of the said product in a large amount of solvent is desirable. Excess dilution would foster undesirable cyclization of the partial ester during formation and undesirable cross-linking of the ester during solvent removal. Generally, from about 5 to about 40% by weight of solvent based on the total reaction mixture is suitable. Suitable solvents for the esterification are the aromatic solvents, such as benzene, toluene, and xylene.

The esterification is performed with the production of water. To effect the esterification it is desirable to remove the water so as to assist the esterification and minimize the revere reaction. Therefore the temperature of the reaction is maintained above the boiling point of water to aid its removal, and below about 200° C., above which the ester tends to darken and polymerize. The temperature is preferably maintained at from about 115° C. to about 150° C. to remove the water produced and to keep the darkening and polymerization of the ester at a minimum.

The esterification is continued until the acid number of the reaction mixture, expressed in milliequivalents of acid per gram of dissolved reactants, is from about 30 to about 100. Water produced by the reaction can easily be recovered from the reaction mixture at the conditions described above, for example, by means of a Dean-Stark trap, or with a steam heated reflux or take-off condenser. The solvent, if used, can be removed from the esterification reaction mixture after the next step by procedures common to the art, such as by distillation.

The third step of the process of the present invention is readily carried out by reacting the partially esterified reaction product of the previous step with a suitable basic material, such as ammonium hydroxide, ammonia, the alkylamines, the alkanolamines, the cycloalkylamines, the cycloalkanolamines, the diamines, pyridine, and the like. To effect this step a stoichiometric amount, or a slight excess, of basic material, based on the amount of carboxyl groups available in the partially esterified reaction product as determined by the acid number, is added to the said product. The said product and basic material, preferably in water, are stirred and heated until a homogeneous solution is formed.

The compositions of the present invention can be readily modified by the addition of glyceride oils and mono- and di-glycerides and fatty acids prepared therefrom. The glyceride oils, for example, include soya oil, linseed oil, safflower oil and tung oil, which are among the more important oils employed in the paint and varnish industry and which are preferred as modifiers for the compositions of this invention. Other glyceride oils may be used, such as, for example, oiticica oil, cottonseed oil, coconut oil, castor oil, dehydrated castor oil, isano oil, and the like.

The mono- or di-glycerides or fatty acids of glyceride oils can be utilized by adding one or more of them to the reaction product of step (1) and treating the mixture in the same manner as the said reaction product is treated in step (2), as heretofore described. Alternatively, the glyceride oils or their glyceride or fatty acid derivatives can be added to the product of step (2) at the heretofore described reaction temperature.

The water-soluble polymeric compositions produced by the process of the present invention can be further diluted with water to yield an aqueous solution of any desirable solids content. Other water-soluble compositions, such as melamine-formaldehyde, hexamethoxymethylmelamine, melamine-acrylic resins, urea-formaldehyde, or phenol-formaldehyde resins, or trimethylol phenol, or drying agents, stabilizers, and the like, can be added to the polymer compositions of the present invention to impart improved properties to the finished product. For example, the addition of from 1 to 50 parts by weight, preferably 5 to 35%, water-soluble compositions listed above, based on the weight of solids in the polymeric composition heretofore described imparts greater scratch resistance to coatings produced therefrom. As a further example of the usefulness of additives, amines are preferably added to the melamine-formaldehyde resin improved composition to stabilize said mixture to improve its shelf life.

The water-soluble polymeric compositions of the present invention are useful as coatings, such as baking enamels. Baking enamels are especially useful in the appliance and automotive industries for product finishes. The compositions of this invention in aqueous solution, can be applied to a surface, such as metal plate and baked to a hard, flexible, water- and solvent-resistant finish.

The preparation of the water-soluble polymeric compositions of this invention and their application will be more clearly understood from the following examples which are presented by way of illustration and are not intended to limit the scope of the invention.

EXAMPLE 1

*Preparation of the reaction product of step (1)*

A hydrocarbon-bottoms stream composed substantially of dimers, codimers, trimers, cotrimers, tetramers and higher polymers of conjugated dienes having from 4 to 6 carbon atoms per diene monomer molecule and having the following approximate physical properties: A.P.I. gravity, 26 degrees at 60° F.; Gardner color, 3; viscosity (S.S.U. at 100° F.), 43 sec.; flash point (Cleveland Open Cup), 135–138° F.; Iodine number, 326; and Aniline point, 34° C., was distilled initially at atmospheric pressure. The distillate fraction from the start of the heating up to an overhead vapor temperature of 140° C. was collected and discarded as monomeric, monoolefinic and nonconjugated diolefinic fraction. The desired dimer-codimer distillate fraction was next collected by reducing the pressure from atmospheric to 100 millimeters mercury and increasing the pot temperature to 206° C. while the overhead vapor temperature remained at 140° C. This dimer-codimer distillate fraction was redistilled and the distillate fraction distilling to an overhead vapor temperature of 121° C. at 100 millimeters mercury was collected.

Redistilled dimer-codimer fraction (1810.7 g.), prepared by the above procedure, was placed in a 5 liter, three-necked, round bottom flask fitted with a mechanical stirrer, air-reflux condenser, internal thermometer, and heating mantle. The dimer-codimer fraction was heated to 110° C. and maleic anhydride (1304.0 g.) was added to the flask. The mixture was heated to and maintained at reflux (157–163° C.) for about four hours. The contents of the flask were cooled to 100° C. and extracted with three 400 ml. portions of heptane to remove unreacted dimer-codimer fraction. The product remaining after the extraction was the crude reaction product of Step (1). This product was heated to 100° C. and about 550 grams thereof were poured into a one-liter reduction flask. The contents of the reduction flask were distilled to a pot temperature of 375° F. at 20 mm. mercury pressure. Upon cooling, the residue, which was the desired reaction product, solidified to a solid having a softening point of 165° F., as determined by the ball and ring method, and an acid number of 614.

EXAMPLE 2

*Preparation of the partially esterified reaction product of step (2)*

Neopentyl glycol (85.5 g.) was placed in a 300 ml. three-necked, round-bottom flask equipped with a mechanical stirrer, a reflux condenser using steam as the coolant, an internal thermometer, and a nitrogen gas inlet tube with an opening beneath the surface of the contents of the flask. The flask was heated to melt the glycol which was then heated to 200° F. Product of Example 1 (82.2 g.; 900 milliequivalents) was added to the flask. The flask was further heated and the contents stirred and mixed until a temperature of about 320° F. was attained. The nitrogen gas inlet tube was connected to a source of nitrogen gas so that the gas bubbled through the mixture throughout the remainder of the reaction. Adipic acid (29.2 g.) was added to the flask, and the contents of the flask slowly heated up to 400° F. over a period of about 6¼ hours until the solution had an acid number of 52.5.

EXAMPLE 3

*Preparation of the partially esterified reaction product of step (2)*

Neopentylglycol (85.5 g.) is placed in the apparatus described in Example 2 and heated to 200° F. Crude product of the reaction of Step 1, that is, before the redistillation procedure, prepared as described in Example 1 (118.7 g.) is added to the flask and the flask contents are heated up to about 400° F. over a period of about 6 hours.

EXAMPLE 4

*Preparation of a water-soluble polymeric composition*

The product of Example 3, while still very hot, is added to a beaker containing 19.5 ml. of dimethylaminoethanol in 200 ml. of water and stirred. The resulting solution is a solution of the polymeric composition of the present invention in water.

EXAMPLE 5

*Preparation of a water-soluble polymeric composition*

The product of Example 2, while still very hot, was divided into two equal portions and poured into separate 600 ml. beakers each containing 9 ml. of dimethylaminoethanol in 100 ml. of water. The initially heterogeneous solutions became homogeneous on stirring. The solutions were mixed and additional water was added to form the desired composition having a viscosity of approximately $Z_4$–$Z_6$ on the Gardner viscosity scale and a Gardner color of about 8, and containing about 40.3% solid material.

A sample of the aqueous solution of the composition of the present invention prepared in Example 5 was poured onto an aluminum can cap and baked at 400° F. for 2 hours. The cap thus supported a cured film of the polymeric composition of the present invention.

A second sample of the aqueous solution of the composition prepared in Example 5 was mixed with hexamethoxymethylmelamine (20% of the total weight of solids) and a 50% solution of water-soluble melamine-acrylic resin "Melaqua No. 600," marketed by American Cyanamid Company, New York, New York, U.S.A. (3% based on the weight of solids in the polymeric composition and in the resin). This solution was coated onto a glass plate by means of a 0.008 mil doctor blade. The plate was then baked at 400° F. for 10 minutes. The coating had a Sward hardness of 52.

A third portion of the aqueous solution prepared in Example 5 was further diluted with water to obtain a solution of lower viscosity until a solution having a solids content of 31.7% was obtained. To this solution was added hexamethoxymethylmelamine (20% of the total weight of solids) and the 50% water soluble melamine-acrylic resin solution described above (3% of the weight of solids in the polymeric composition and in the resin solution). For the purpose of chemical resistance tests, ten test tubes were dipped in the above solution so that about three-quarters of the outside surface of the tubes were evenly coated with the solution. The test tubes were cured by baking at 400° F. for 10 minutes. The test tubes were placed in beakers containing various substances and solutions so that only the coated surfaces of the test tubes were immersed. To accelerate the chemical resistance tests, the test substances and solutions were maintained at 127° F. throughout the test. Listed in the table below are the substances utilized in the tests and the length of time up to 195 hours that the coating withstood attack, that is, until the coating could be scratched by a thumbnail pulled across the surface of the coating.

*Chemical resistance test*

| Substance: | Time to failure up to 195 hrs. |
|---|---|
| Water | No attack. |
| 3% sodium hydroxide in water | 70 hours. |
| 3% calcium chloride in water | No attack. |
| 3% sodium chloride in water | Do. |
| 4% aqueous acetic acid | Do. |
| Xylene | Do. |
| Turpentine | Do. |
| V, M and P (solvent) | Do. |
| Butyl acetate | 30 minutes. |
| Isopropyl alcohol | 46 hours. |

EXAMPLE 6

Example 2 was repeated using the same equipment, quantities of ingredients and procedure, except that the glycol was heated to 340° F. before the adipic acid was added and the mixture was reacted until an acid number of 54.5 was reached. This heated mixture was poured with stirring into two 600 ml. beakers each containing 7 ml. of dimethylaminoethanol in 100 ml. of water. The homogeneous solutions in each beaker were combined and stirred with additional water to obtain the desired composition having a viscosity of $Z_1$ on the Gardner scale. The composition was further diluted with water to a viscosity of R+ on the Gardner scale. This solution had a solids content of 33.7%.

A sample of the above solution was mixed with hexamethoxymethylmelamine (20% of the total weight of solids) and the water-soluble melamine-acrylic resin described in Example 5 (3% of the weight of solids). The resulting solution was coated on a glass plate with a 0.008 mil doctor blade and the coated plate baked at 400° F. for 10 minutes. The coating had a Sward hardness of 57.

A second portion of the solution was mixed with hexamethoxymethylmelamine and melamine-acrylic resin as described above and the resulting solution coated by means of a 0.008 mil doctor blade onto cold rolled steel and standard phosphatized steel test panels. The coated panels were baked at 400° F. for 10 minutes. The baked coatings, which had a thickness of about 1 mil, were flexible and passed Gardner reverse impact tests as follows:

*Reverse impact tests*

| Panel: | Reverse impact, inch-pounds |
|---|---|
| Cold rolled steel | 160.[1] |
| Phosphatized steel | less than 40. |

[1] Maximum quantity measurable by apparatus.

A third portion of the aqueous solution prepared in Example 6 was further diluted with water to lower the viscosity until a solution having a solids content of 27.1% was obtained. To this solution was added hexamethoxymethylmelamine (20% of the total weight of solids) and the water-soluble melamineacrylic resin described above (3% of the weight of solids of the polymeric composition). Test tubes were coated with this solution as described in Example 6, baked at 400° F. for 10 minutes and placed in beakers containing the various test substances and solutions. The beakers were maintained at 127° F. throughout the test. Listed below are the substances utilized and the length of time up to 195 hours that the coating withstood attack, that is until the coating could be scratched by a thumbnail pulled across the surface of the coating.

*Chemical Resistance Test*

| Substance: | Time to failure up to 195 hrs. |
|---|---|
| Water | No attack. |
| 3% sodium hydroxide in water | 46 hours. |
| 3% calcium chloride in water | No attack. |
| 3% sodium chloride in water | Do. |
| 4% aqueous acetic acid | Do. |
| Xylene | 54 hours. |
| Turpentine | No attack. |
| V, M and P (solvent) | Do. |
| Butyl acetate | 30 minutes. |
| Isopropyl alcohol | 46 hours. |

EXAMPLE 7

A bottoms stream similar to the stream described in Example 1 was distilled initially at atmospheric pressure. The distillate fraction from the start of the heating up to an overhead temperature of 140° C. was collected and discarded. The desired dimer-codimer distillate fraction was next collected by reducing the pressure from atmospheric to 100 millimeters mercury and increasing the pot temperature to 200° C. This fraction was redistilled and the distillate fraction distilling to an overhead vapor temperature of 114° C. at 100 millimeters mercury was collected.

Redistilled distillate fraction (1624.8 g.) prepared as described above, was heated to about 110° C. and crushed maleic anhydride (1170.0 g.) was added thereto. The mixture was heated to and maintained at reflux for about four hours. The resulting solution was cooled to about 110° C. and then poured into three one-liter reduction flasks. The contents of the flasks were distilled to a pot temperature of 375° F. at 20 mm. mercury pressure. Upon cooling, the residue from the first flask, which was desired reaction product of Step (1), solidified to a solid resin having a softening point of 161° F., as determined by the ball and ring method, and an acid number of 597.

1,5-Pentanediol (72.8 g.) was heated by the procedure of Example 2 to 200° F. A portion of the product of the above reaction (72.0 g.) was added to the pentanediol and the mixture stirred and heated to 310° F. Adipic acid (24.5 g.) was added and the resulting mixture slowly heated up to 360° F. over a period of about 9 hours until the solution had an acid number of 44.5. This solution was poured while still hot into a solution of 13 ml. of dimethylaminoethanol in 270 ml. of water and stirred until a homogeneous solution was formed. The resulting solution had a viscosity of Y on the Gardner scale, a Gardner color of about 6+, and contained about 29.4% solids.

A portion of the above solution was mixed with hexamethoxymethylmelamine (20% based on the total weight of solids) and the melamine-acrylic resin described in Example 3 (3% of the weight of solids in the polymeric composition), and coated by means of a 0.008-mil doctor blade onto cold rolled steel and standard phosphatized steel test panels at the thickness indicated in the table below. The coated panels were baked at 400° for 10 minutes. The baked coatings were flexible and passed Gardner reverse impact tests as follows:

REVERSE IMPACT TESTS

| Panel | Thickness of Coating, mils | Reverse Impact, inch-pounds |
|---|---|---|
| Cold Rolled Steel | About 1 | [1] 160 |
| Phosphatized Steel | 0.88 | 140 |

[1] Maximum quantity measurable by apparatus.

The chemical resistance of the coating to various chemicals was determined by measuring the electrical resistance of a cured film of the polymeric composition of this invention containing hexamethoxymethylmelamine and melamine-acrylic resin as described above, under attack by aqueous solutions of the chemicals in the following manner: The solution of polymeric composition used in the impact test was coated on a strip of sheet metal to a thickness of 1.18 mils. The coated strip was baked at 400° F. for 10 minutes. A cylindrical piece of glass tubing was placed with one end of the tube resting on the coating, and the end of the tube sealed thereto with silicone based stopcock grease. The tube was filled with 25 milliliters of the aqueous test solution. An electrode was immersed into the solution at the top of the tube and the strip itself served as the second electrode. Periodically during the test a potential of 15.0 volts was placed across the electrodes and the resistance measured. Intially a very high resistance was measured. If the coating was chemically attacked by the test solution, the resistance was reduced, and if the test solution reached the strip by penetrating the coating, the resistance would be greatly lowered. The electrical resistance as a measure of chemical resistance of the coating prepared in this example is as follows:

[Electrical resistance, ohms]

| Test Solution | Initial | 7 days later |
|---|---|---|
| 3% Aqueous Sodium Hydroxide Solution | ¹ 125,000,000 | ¹ 125,000,000 |
| 3% Aqueous Sodium Chloride Solution | ¹ 125,000,000 | ¹ 125,000,000 |

¹ Maximum reading on meter.

EXAMPLE 8

A portion of the bottoms streams described in Example 7 was distilled at atmospheric pressure to an overhead temperature of 140° C., and the fraction distilling from atmospheric pressure to 100 mm. mercury pressure at 140° C. was collected. The fraction was redistilled and the fraction distilling up to an overhead temperature of 122° C. at 100 mm. mercury pressure was collected.

This fraction (1880.7 g.) was heated to 110° C. and crushed maleic anhydride (1727.5 g.) was added. The mixture was heated to about 160° C. and refluxed at that temperature for four hours. The resulting solution was cooled to about 110° C. and heptane (400 ml.) added. The mixture was stirred for 5 minutes and allowed to settle. The top two layers of the three layers were siphoned off and allowed to settle. The bottom layer of the two separated layers was added to the third layer described about and the mixture distilled to an end point of 375° F. pot temperature at 20 mm. mercury pressure. The residue from the distillation was the desired product of Step (1) and had an acid number of about 635.

Triethylene glycol (90.6 g.) was heated as described in the previous example to 220° F. A portion of the reaction product described above (62.9 g.) was added to the triethylene glycol and the mixture stirred and heated to 320° F. Adipic acid (21.4 g.) was added and the resulting mixture slowly heated to 410° F. over a period of about 31 hours until the solution had an acid number of 23.7. This solution was poured while still hot into a solution of 7.0 ml. of dimethylaminoethanol in 150 ml. of water and stirred. The resulting homogenous solution had a viscosity of V— on the Gardner scale and contained about 41.5% solids.

A portion of the above solution was mixed with hexamethoxymethylmelamine (20% based on the total weight of solids) and the melamine-acrylic resin described in Example 3 (3% of the weight of solids in the polymeric composition), and coated by means of a 0.008 mil doctor blade onto cold rolled steel and standard phosphatized steel test panels at the thicknesses indicated in the table below. The coated panels were baked at 400° F. for 10 minutes. The baked coatings were flexible and passed Gardner reverse impact tests as follows:

REVERSE IMPACT TESTS

| Panel | Thickness of Coating, mils | Reverse Impact, inch-pounds |
|---|---|---|
| Cold rolled Steel | 1.08 | ¹ 160 |
| Phosphatized Steel | 1.20 | ¹ 160 |

¹ Maximum quantity measurable by apparatus.

I claim:
1. A process for the production of an improved water-soluble polymeric composition comprising (1) reacting a hydrocarbon fraction composed substantially of dimers and codimers of conjugated dienes having from 4 to 7 carbon atoms per diene monomer with from about 42 to about 60% by weight of the total reactants of an α,β-ethylenically monounsaturated polycarboxylic acid anhydride at a temperature between about 125° and about 250° C. for between about 2 and about 24 hours; (2) esterifying the product of (1) with from about 30 to about 100% by weight, based on the weight of the product of (1), of a glycol having the formula

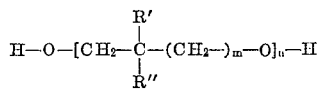

wherein R' and R" are independently selected from the group consisting of hydrogen and alkyl groups containing from one to 3 carbon atoms, $m$ is an integer from 0 to 10, and $n$ is an integer from 1 to 50, at a temperature between about 115° C. and about 200° C., until a reaction product is formed having an acid number of from about 20 to about 100; and (3) reacting said reaction product with at least a stoichiometric amount of a compound selected from the group consisting of ammonium hydroxide, ammonia, alkylamines, alkanolamines, cycloalkylamines, cycloalkanolamines, diamines and pyridine.

2. The composition produced by the process of claim 1.
3. The process of claim 1 wherein the reacting of step (1) is performed by heating, and the esterifying of step (2) is performed by reacting (A) the product of step (1) with (B) from about 30% to about 50% by weight based on the weight of the product of (1) of the glycol and (C) a dicarboxylic acid containing from 4 to 9 carbon atoms.
4. The composition produced by the process of claim 3.
5. The process of claim 1 wherein the reacting of step (1) is performed by heating, the α,β-ethylenically monounsaturated polycarboxylic acid is maleic anhydride, and the esterifying of step (2) is performed by reacting (A) the product of step (1) with (B) from about 30% to about 100% by weight, based on the weight of the product of (1), of a glycol having the formula

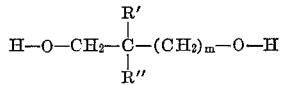

wherein R', R" and $m$ are as described in claim 1 and (C) a dicarboxylic acid containing from 4 to 12 carbon atoms.

6. The composition produced by the process of claim 5.
7. The process of claim 5 wherein the hydrocarbon fraction is composed sustantially of dimers and codimers of conjugated dienes having from 4 to 6 carbon atoms per diene monomer and is heated in step (1) with the maleic anhydride at a temperature of between about 150° and about 200° C. for between about 3 and about 10 hours; step (2) is performed by reacting the product of (1) with from about 50% to about 100% by weight, based on the weight of the product of (1), of a glycol selected from the group consisting of neopentyl glycol and 1,5-pentanediol and from about 25 to about 60% by weight, based on the weight of the product of (1), of a straight chain dicarboxylic acid containing from 4 to 8 carbon atoms, at a temperature of from about 115° to about 150° C.; and a stoichiometric amount of the said compound is reacted in step (3).
8. The composition produced by the process of claim 7.
9. An improved water-soluble polymeric composition comprising the product of (1) reacting a hydrocarbon fraction composed substantially of dimers and codimers of conjugated dienes having from 4 to 7 carbon atoms per diene monomer with from about 42 to about 60% by weight of the total reactants of an α,β-ethylenically monounsaturated polycarboxylic acid anhydride at a temperature between about 125° and about 250° C. for between about 2 and about 24 hours; (2) adding a glyceride selected from the group consisting of glycerides derived from soya bean oil, linsed oil, safflower oil, and tung oil at a temperature of from about 115° C. to about 200° C.; (3) reacting the mixture of (2) with a glycol having the formula

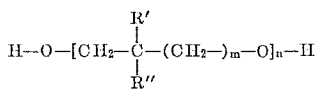

wherein R' and R" are independently selected from the group consisting of hydrogen and alkyl groups containing from 1 to 3 carbon atoms, $m$ is an integer from 0 to 10, and $n$ is an integer from 1 to 50, at a temperature between about 115° C. and about 200° C., until a reaction product is formed having an acid number of from about 20 to about 100; and (4) reacting said reaction product with a compound selected from the group consisting of ammonium hydroxide, ammonia, alkylamines, alkanolamines, cycloalkylamines, cycloalkanolamines, diamines and pyridine.

10. An improved water-soluble polymeric composition comprising the product of (1) reacting a hydocarbon fraction composed substantially of dimers and codimers of conjugated dienes having from 4 to 7 carbon atoms per diene monomer with from about 42 to about 60% by weight of the total reactants of an α,β-ethylenically monounsaturated polycarboxylic acid anhydride at a temperature between about 125° and about 250° C. for between about 2 and about 24 hours; (2) adding a fatty acid selected from the group consisting of fatty acids derived from soya bean oil, linsed oil, safflower oil, and tung oil at a temperature of from about 115° C. to about 200° C.; (3) esterifying the mixture of (2) with a glycol having the formula

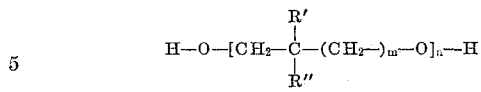

wherein R' and R" are independently selected from the group consisting of hydrogen and alkyl groups containing from 1 to 3 carbon atoms, $m$ is an integer from 0 to 10, and $n$ is an integer from 1 to 50, at a temperature between about 115° C. and about 200° C., until a reaction product is formed having an acid number from about 20 to about 100; and (4) reacting said reaction product with a compound selected from the group consisting of ammonium hydroxide, ammonia, alkylamines, alkanolamines, cycloalkylamines, cycloalkanolamines, diamines and pyridine.

References Cited

UNITED STATES PATENTS

| | | | |
|---|---|---|---|
| 2,467,958 | 4/1949 | Bloch | 260—75 |
| 2,548,388 | 4/1951 | Moffett | 260—22 |
| 2,555,595 | 6/1951 | Morris et al. | 260—75 |
| 2,860,112 | 11/1958 | Leary et al. | 260—75 |
| 2,952,646 | 9/1960 | Carmody | 260—75 |
| 2,964,482 | 12/1960 | Leary et al. | 260—75 |
| 3,098,834 | 7/1963 | Jerabek | 260—22 |

FOREIGN PATENTS 578,867    7/1946    Great Britain.

OTHER REFERENCES

Patton: Alkyl Resin Technology Formulating Techniques and Allied Calculations, Interscience Publishers, 1962, New York, 197 pages, pp. 120 and 121 relied upon, TP978, P34, copy in group 140.

DONALD E. CZAJA, *Primary Examiner.*

R. W. GRIFFIN, *Assistant Examiner.*